H. C. WELTER.
CHECK WRITING MACHINE.
APPLICATION FILED DEC. 7, 1916.

1,278,265.

Patented Sept. 10, 1918.
5 SHEETS—SHEET 1.

INVENTOR
Herman C. Welter
BY
Osborne F. Gurney
ATTORNEY

H. C. WELTER.
CHECK WRITING MACHINE.
APPLICATION FILED DEC. 7, 1916.

1,278,265.

Patented Sept. 10, 1918.
5 SHEETS—SHEET 2.

INVENTOR
Herman C. Welter
BY
Osborne F. Gurney
ATTORNEY

H. C. WELTER.
CHECK WRITING MACHINE.
APPLICATION FILED DEC. 7, 1916.

1,278,265.

Patented Sept. 10, 1918.
5 SHEETS—SHEET 3.

INVENTOR
Herman C. Welter
BY
Osborne F. Gurney
ATTORNEY

UNITED STATES PATENT OFFICE.

HERMAN C. WELTER, OF ROCHESTER, NEW YORK, ASSIGNOR TO HALL-WELTER COMPANY, INC., OF ROCHESTER, NEW YORK.

CHECK-WRITING MACHINE.

1,278,265.  Specification of Letters Patent.  Patented Sept. 10, 1918.

Application filed December 7, 1916. Serial No. 135,521.

*To all whom it may concern:*

Be it known that I, HERMAN C. WELTER, a citizen of the United States, residing at Rochester, in the county of Monroe and State of New York, have invented a new and Improved Check-Writing Machine, of which the following is a specification.

My invention relates to that class of printing machines known as check writers, the function of which is to print in words on checks, drafts, or other negotiable instruments, the exact amounts for which they are written and in such a manner as to prevent erasure, for fraudulently "raising" the amount payable, by breaking the paper throughout the printed surface and forcing ink into the disrupted fibers.

The main object of the invention is to provide an automatically operable means for feeding a check, or other instrument, variable distances to secure equal spacing between the printed words or characters and adapted for use with machines of the class in which the lines of type are arranged on the periphery of a wheel parallel with its axis of rotation and in which the type wheel and platen are movable relatively toward each other to perform the printing operation.

I accomplish this object by means of feeding mechanism especially designed for and shown as embodied in an improved machine of the class described for which a patent application was filed by me under date of March 3, 1916, Serial No. 81,797. Such a machine is simple and strong in construction, and both easily and quickly operable, the type wheel being the movable member in the printing operation. The body is designed to permit instruments in writing other than the ordinary check or draft, as invoices, stock certificates, etc., to be placed in the machine and printed along any desired line thereof; and the writing is visible,—that is, each word is brought into view of the operator before operation is begun to print the succeeding word or character.

Another object is to provide an adjustment to the check feeding means whereby the length of the spacing between the printed words or characters may be predeterminable.

Another object is to provide means for positively locking the feeding wheels against rotation, after each successive forward movement of the check, until after the next printing operation, thus holding the check against any accidental movement which would result in unequal spacing.

A still further object of the invention lies in the improved hand lever which is actuated to move the type wheel into printing operation and to effect the operation of the feeding mechanism.

The invention will first be described and will then be particularly defined in the claims hereinafter set forth.

The accompanying drawings illustrating the invention are as follows:—

Similar reference numerals refer to similar parts throughout the several views.

Figure 3:
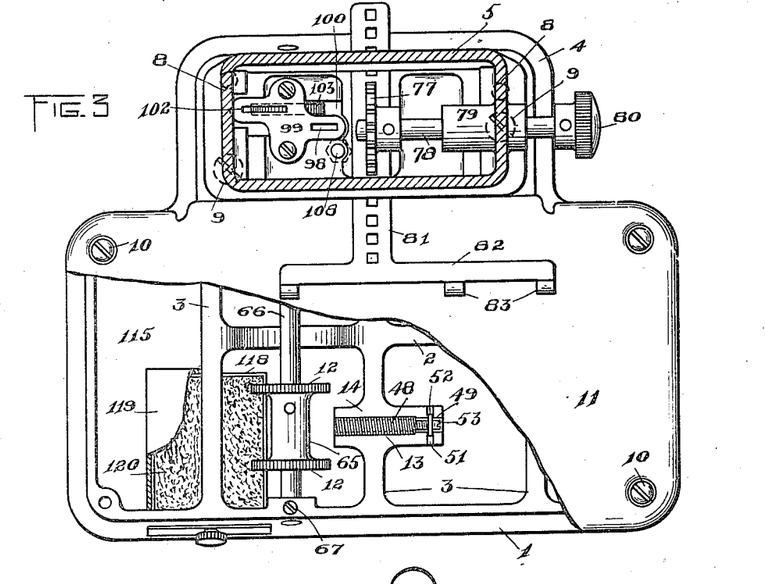
Fig. 3 is a plan view of the base with part of the cover plate removed and with the rear portion of the top part of the casing shown in section along the line $x$—$y$ of Fig. 1.
Figure 6:
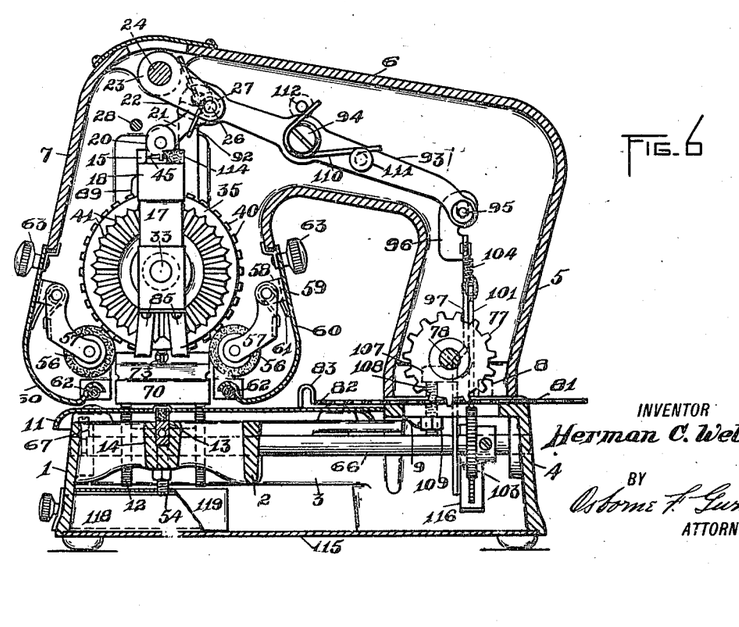
Fig. 6, a vertical sectional view as seen from the right and taken along the line $x^2$—$y^2$ of Fig. 4, with parts of the operating mechanism shown in full.

The casing or body of the machine consists of two separable parts, a base and a top section. The base comprises a rectangular main front portion 1, having side walls which are reinforced by both longitudinally and transversely extending ribs 2 and 3, respectively, and a rear extension 4; while the top comprises a four walled upright member 5 from which extends forwardly an arm or neck 6 which terminates in a depending head 7. The bottom of the upright member 5 is supported upon the extension member 4 of the base and secured thereto by means of dowel pins 8 and screws 9, as shown in Figs. 3 and 6, the screws extending through the top of the base and threaded into the member 5.

The base portion 1 has secured thereon by screws 10 a cover plate 11 for supporting a check (which term will hereinafter means any instrument that may be printed by the machine) and in which plate suitable slot openings are provided to receive the tops of the feed rollers 12 and the platen 13, the latter member being adjustably supported, in a manner to be explained, in a boss 14 forming an integral part of one of the reinforcing ribs 3 of the base.

Figure 4:
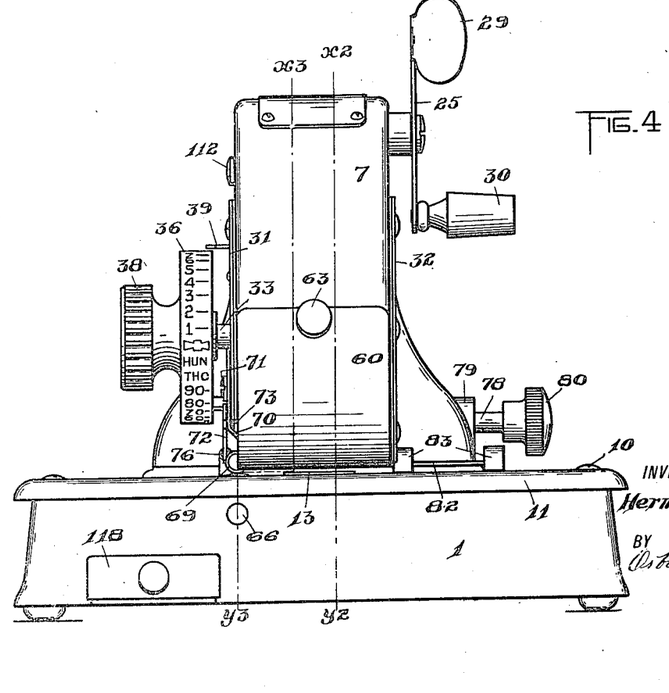
Fig. 4, a front elevation of the machine.
Figure 5:
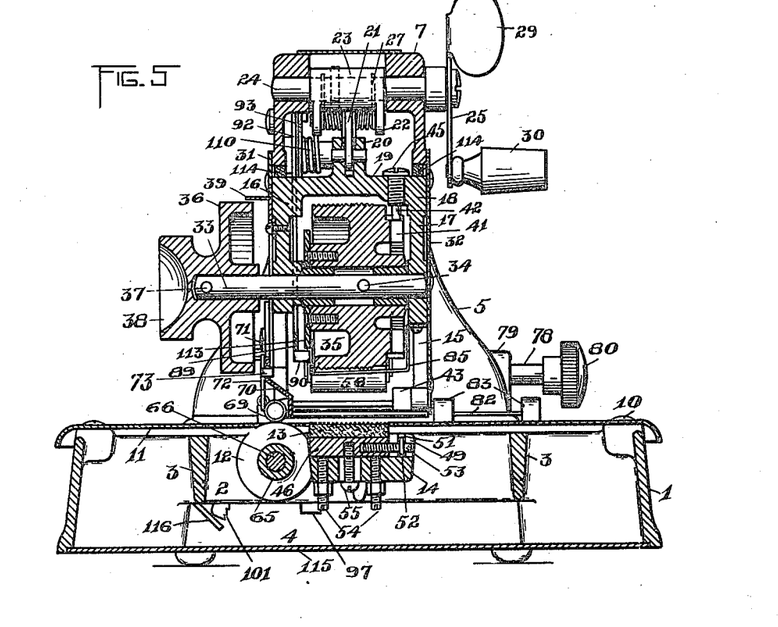
Fig. 5, a vertical sectional view taken along the line $x^1$—$y^1$ of Fig. 2.
Figure 7:
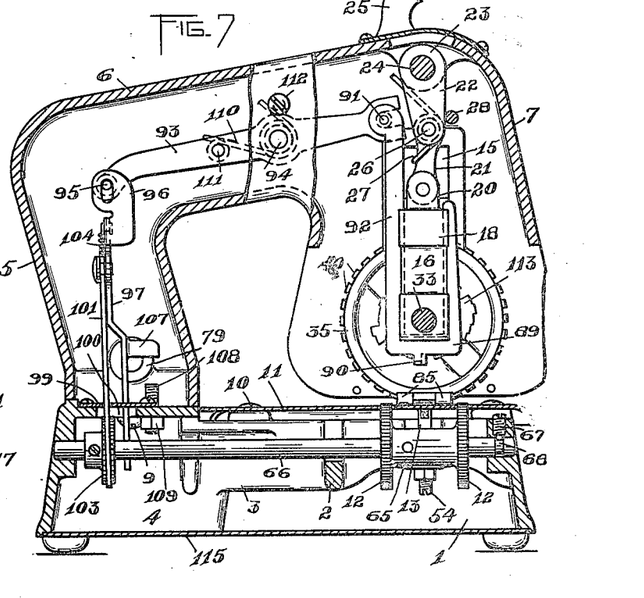
Fig. 7, a vertical sectional view as seen from the left and taken along the line $x^3$—$y^3$ of Fig. 4, with parts of the operating mechanism shown in full and with other parts removed.
Figure 8:
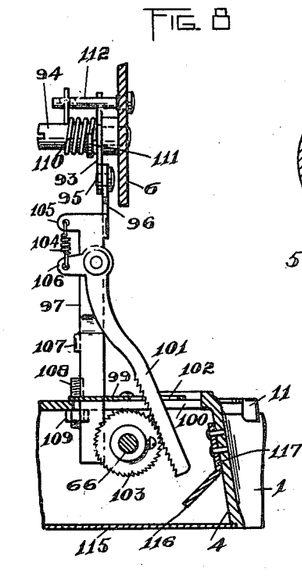
Fig. 8, an end view from the left, with respect to Fig. 7, of the feeding mechanism seen in such figure and with parts of the machine body shown in section.
Figure 9:
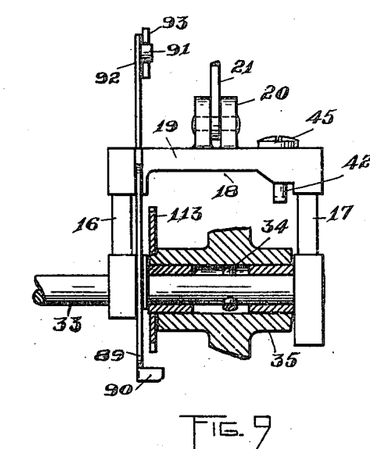
Fig. 9, a detail showing in front elevation the type wheel supporting member and parts operating therewith.
Figure 10:
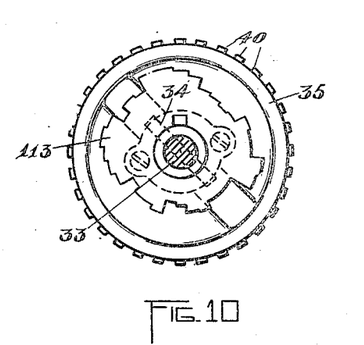
Fig. 10, an end view of the type wheel and the spacing wheel secured thereto.

In the side walls of the head 7 are vertically extending openings 15 forming guide-ways for the side arms 16 and 17 of a yoke 18 on the cross bar 19 of which are formed a pair of centrally disposed upwardly extending ears 20. These ears are pivotally connected with one end of a link 21, the other end of which has pivotal connection with the outer ends of arms 22 formed on a member 23 extending between the side walls of the head 7 and secured on a shaft 24 revolubly mounted in such side walls. This shaft extends outwardly beyond the right hand wall, with respect to Figs. 4 and 5, and has secured thereon the hand operating lever 25. On the rod 26, forming the pivotal connection between the link 21 and arms 22, there is a coiled spring 27 having its central portion engaging under the link while its ends engage against the member 23, the action of the spring being to return such members from the position in which they are seen in Fig. 7 to their normal and inoperative position, as shown in Figs. 5 and 6, when the lever 25 has been released by the hand of the operator.

The lever 25 is secured near its center to the shaft 24 and has a thumb piece 29 bent from one end thereof while from the other end projects a handle 30 to be engaged by the fingers of the operator. Thus it will be seen that both a push and a pull are exerted on the lever in its angular throw, and by having both the thumb piece and handle, as described, the lever can be firmly grasped and is easily operated by a slight movement of the wrist.

Figure 2:
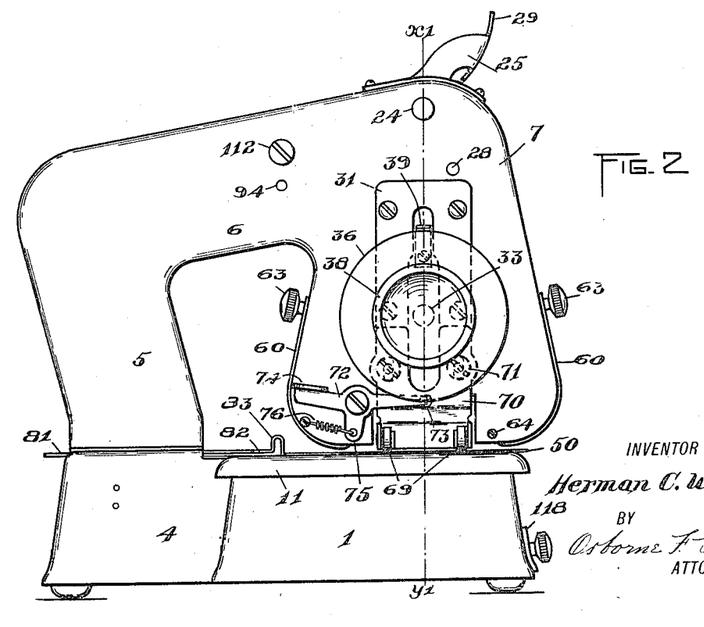

The side arms of the yoke 18 are slidable in the vertical guide-ways 15 and the yoke is held against lateral movement by side plates 31 and 32 covering the guide-ways and secured by screws to the outer faces of the side walls of the head 7. The plate 31 is slotted to receive and permit a raising and lowering with the yoke 18, which is effected by the lever members above described, of a horizontally extending shaft 33 revolubly mounted in the side arms 16 and 17 and on which and between such arms there is secured by a pin 34 the type wheel 35. This shaft extends outwardly beyond the left hand side wall of the head 7 and has a dial wheel 36 secured thereon by a pin 37, such wheel being provided with suitable means, as the knurled head 38, for readily turning the same to bring any one of the designating characters located on the periphery thereof into registration with the pointer 39 projecting from and secured to the side plate 31, as seen in Figs. 2, 4 and 5.

The type wheel 35 carries on its periphery and, preferably, formed integrally therewith a plurality of equally spaced type bars 40 extending parallel with the axis of rotation, and characters designating the several lines of type are formed on the periphery of the dial wheel 36 so that a selected line of type is brought into printing position above the platen 13 by turning the dial wheel to bring corresponding designating characters thereon directly under the pointer 39.

On one face of the type wheel 35 is a projecting ring which is slotted to form a plurality of equally spaced lateral projections 41, the number of such slots being the same as that of the type bars 40 and having their respective center lines in the same radial planes. The outer ends of these projections are beveled to receive in engagement therewith and between two adjacent ones thereof the correspondingly conformed lower end of a spring actuated plunger 42, the purpose of which is to cause the proper centering of the selected type bar and to yieldingly hold the type wheel against rotation when not in engagement with the positive locking means, which latter comprises a member 43 extending inwardly from the lower end of the side plate 32 and conformed to engage within the slot between two adjacent projections 41 when the type wheel is moved downward and before the type characters are brought into engagement with the platen, thus holding the wheel positively against the slightest rotary movement during the printing operation. When the type wheel is turned to bring a selected line of type into printing position, the plunger 42 is forced by the projections 41 upwardly against the action of a coiled spring 44 contained within a hollow screw 45 threaded into the cross bar 19 of the yoke 18.

In the operation of machines of the character to which my invention pertains, the words or other designating characters are not only printed on the check but the material thereof is either perforated or the fibers are broken throughout the printed surface and to accomplish this the type and platen have interfitting printing faces, such as pin points formed on the type which engage through perforations therefor in the platen, or alternating parallel extending ridges and grooves formed on both members, the ridges of one member being adapted to enter the grooves of the other, and in either event the platen is necessarily adjustably supported in order to secure proper registration.

The platen which I prefer to use and which is shown in the accompanying drawings is one made in accordance with an invention for which Letters Patent were issued to me under date of March 7, 1916, No. 1,174,642. It comprises a bar 46 having a longitudinally extending channel for receiving a sub-inking pad 47 and across the channel, forming the face of the die or platen, are a plurality of equally spaced parallel extending wires 48, the ends of which are turned down and soldered to the sides of the bar 46. The type characters on the wheel 35 are cut to form alternating ridges and grooves, the latter being adapted to receive the wires 48 of the platen while the ridges engage between such wires to force the under face of the check into contact with the sub-inking pad 47, whereby ink is applied to the under face of the check as well as to the top, the means for the latter being hereinafter described.

The platen bar 46 is seated in a slot 49 cut lengthwise in the boss 14 on the centrally disposed rib 3 of the base portion 1. The side walls thus formed on the boss 14 have a slot 51 cut thereacross to receive the shoulder 52 of a screw 53 threaded longitudinally into the bar 46, whereby when turning the screw the same is caused to be the fixed and the platen the movable member. Vertical adjustment is provided for by two screws 54 threaded upwardly through the support 14 and which engage the bottom of the bar 46 near its ends, while the platen is retained in proper position of adjustment by a centrally disposed screw 55 threaded thereinto which extends upwardly through a slot opening therefor in the said support.

Figures 11, 12, 13, 14, 15, 16, 17, 18, 19, 20, 21, 22:
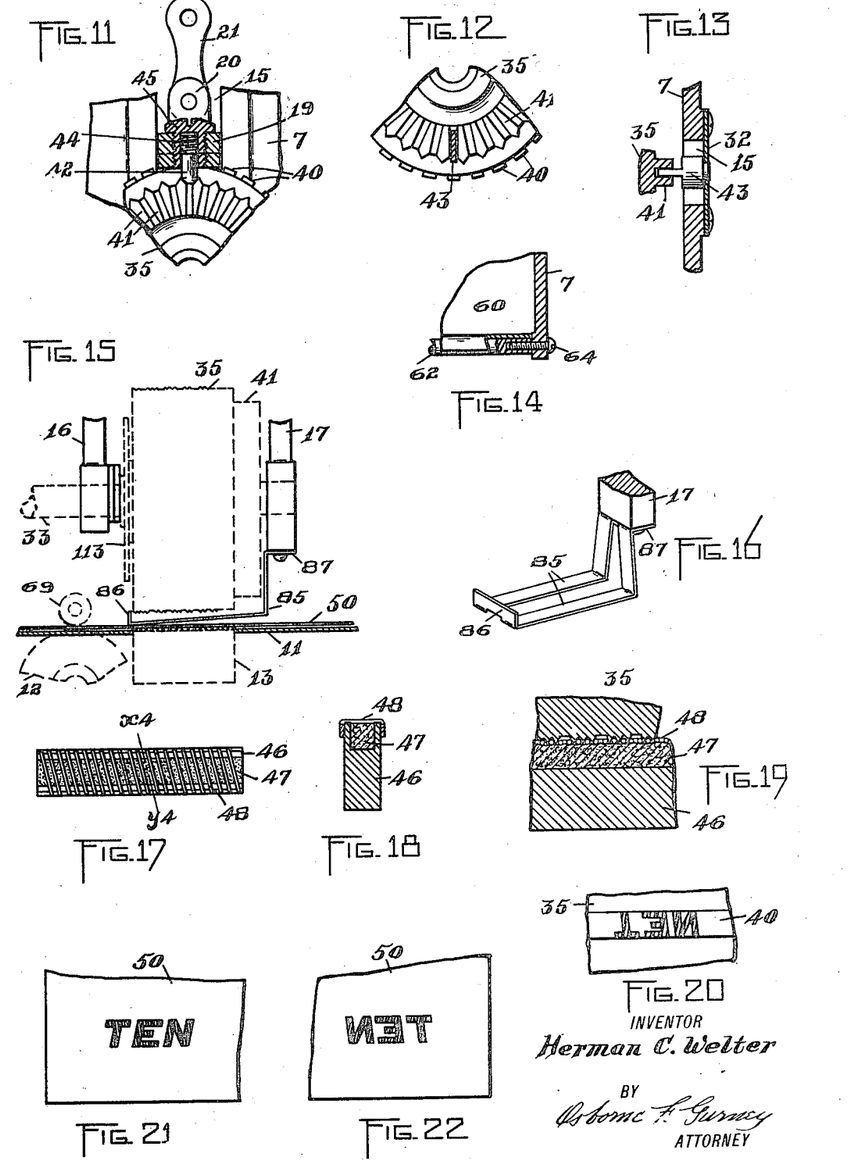
Fig. 11, a detail partly in section showing the means used for properly centering the type wheel.
Fig. 12, a portion of the type wheel in end view and the means for locking the same against rotation.
Fig. 13, a plan view of the type wheel locking means with parts of the machine body and the type wheel shown in section.
Fig. 14, a detail partly in section showing the means for removably supporting the plates which carry the ink rollers.
Fig. 15, a side view of the stripper device with parts of the printing and feeding mechanism shown in dotted lines.
Fig. 16, a perspective view of the stripper.
Fig. 17, an enlarged plan view of the sub-inking platen.
Fig. 18, a sectional view of the platen taken along the line $x^4$—$y^4$ of Fig. 17.
Fig. 19, a longitudinal sectional detail showing the type and platen in operative engagement.
Fig. 20, a fragmentary portion of the type wheel.
Figs. 21 and 22 illustrate the appearance of the face and reverse sides, respectively, of the check when printed.

At 56 are two ink rollers extending parallel with the type wheel 35 and located on opposite sides thereof below its axis. These rollers are supported in the outer ends of swinging brackets 57 pivotally connected at their inner ends to ears 58 bent from plates 59 secured to the members 60 which comprise cover plates for the cut away lower portions of the front and rear walls of the head 7. The ink rollers are at all times held in yielding contact with the type wheel by the action of coiled springs 61 encircling the rods forming the pivotal connections between the brackets 57 and ears 58, and ink therefrom is supplied to the type when turning the wheel to bring different lines of type into printing position. A downward movement of the type wheel causes the ink rollers to be swung farther apart and to permit this the cover plates are of the curved formation shown. These plates are detachably held in place by having their bottom edges curved to engage over rods 62 extending between the side walls of the head 7 and by a centrally positioned locking member for each, such as that shown at 63 in Figs. 1, 2, 4 and 6. The rods 62 are secured to place, as seen in sectional detail in Fig. 14, by screws 64 threaded into the ends thereof through the side walls of the head 7.

The feed rollers 12 are located one each side and slightly in advance of the platen 13 with their peripheries engaging through slot openings in the base plate 11 and projecting just above the surface thereof. They are carried on the ends of a sleeve 65 secured upon a rearwardly extending shaft 66 having bearings in the front and rear walls of the machine base. This shaft is automatically rotated, in a manner and for the purpose hereinafter described, and is held against longitudinal movement by a pin or screw 67 in one of the bearings, engaging the adjacent shoulders formed by the reduced portion 68 of the shaft. (See Fig. 7.)

Engaging the tops of the feed rollers 12 are small gripping rollers 69 mounted in ears extending outwardly from the lower portion of a plate 70 held in position against the outer face of the side cover plate 31 by screws 71. This plate 70 has a slight vertical movement in order to raise the rollers 69 from the feed rollers to permit the insertion of a check therebetween, such movement being provided for by slots through which the screws 71 extend; and the means for raising the plate 70 comprises a lever 72 pivoted at its center to the side wall of the head 7. On the outer end of the lever 72 there is a projection 73 adapted to engage a centrally disposed opening therefor in the plate 70, on the inner end there is formed a member 74 to be engaged by the finger of the operator, while the downwardly extending arm 75 has connected therewith one end of a coiled spring 76 the other end of which is fastened to a pin in the side wall of the head 7. Operating the lever 72 causes a raising of the plate 70 which lifts the rollers 69 from engagement with the feed rollers 12, all of which is against the action of the spring 76 which member causes the parts to resume their normal positions, being that indicated in the drawings, when pressure on the lever is released. The lower portion of the plate 70 is offset toward the platen, see Figs. 2, 5 and 6, so that the gripping rollers 69 will engage the tops of the feed rollers and, also, for the purpose of bringing the last printed word into view before the succeeding printing operation is commenced.

Within the top part 5 of the casing is a pinion 77 secured on the inner end of a shaft 78 revolubly mounted in a boss 79 formed on one of the side walls of such part of the casing and having an operating head 80 on its outer end. This pinion causes a movement forward and back of a check gage comprising a sheet metal rack 81 on the forward end of which is a cross head 82 having formed thereon a plurality of projections bent to form inverted U-shape members 83 having their free ends engaging the surface of the base plate 11 and forming a gage or fence against which the inner edge of the check 50, Figs. 2 and 15, engages and whereby a proper alinement of the printing is obtained.

Figure 1:
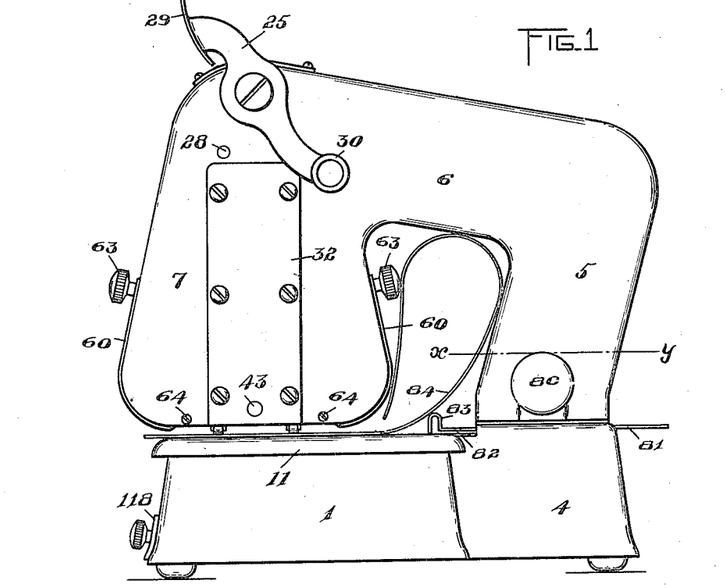
Figures 1 and 2 are opposite side elevations of the machine.

The design of the machine is such that the space formed between the upright portion 5 of the casing and the depending head 7 permits instruments other than the ordinary check or draft, such as invoices, stock certificates, etc., indicated at 84 in Fig. 1, to be placed in the machine and printed on any desired line thereof.

It is necessary to provide means whereby, after each printing operation, the material printed on will be prevented from being raised from the plate 11 by the type in the return movement of the type wheel, and to this end I make use of a movable stripper such as shown in Figs. 5, 6, 15 and 16. The device is formed of thin metal and comprises a pair of arms 85 extending downward from the side arm 17 of the yoke 18 to the bottom of the type wheel 35 and thence under the wheel as shown, such arms being spaced apart to allow a type bar 40 to engage between them. Their outer ends are connected by a cross piece 86 while their inner ends are connected by a member 87 secured by screws to the bottom of the side arm 17 of the yoke and with which the stripper is raised and lowered. The portions of the stripper arms under the type wheel are inclined slightly so that the free ends thereof will engage the check just prior to contact therewith of the type, and, consequently, on the upward movement of the parts the resiliency of the arms in resuming their normal inclined position will cause them to hold the check in contact with the plate 11 for a brief period of time to effect a stripping of the check from the type while the latter moves clear of the platen.

It will be understood that the words or characters on the several type bars will be of different lengths, that in writing a check it is necessary to print a series of these along a single line, and that it is desirable to have the words or characters uniformly spaced. This requires, in a machine having an automatic feed, means for advancing the check after each printing operation a distance equal to the length of the printed word plus the desired uniform space. The check, then, must be fed variable distances according to the lengths of the several words or characters printed, and to accomplish this I have provided the mechanism now to be described which includes, also, means for predetermining the distance which the words or characters are to be spaced from each other and additional means for locking the feed rollers against rotation after each advance of the check until the proper time for its next forward movement.

Slidable in vertically extending grooves cut in the side arm 16 of the yoke 18 are the arms of a U-shape spacing bar 89 which has a short inward projection 90 at its lower end and a stud 91 carried by the upper end of the longer arm 92. This stud engages the slot in the bifurcated outer end of a rearwardly extending lever 93 which is pivoted near its center on a stud 94 projecting inwardly from the left hand side wall of the neck 6 of the casing and has a pin-and-slot connection 95 at its rear end with an upwardly extending ear 96 bent at right angles from a bar 97 extending downward through and guided in a slot 98 in a plate 99 secured to the top of the base portion 4 over the opening 100 formed therein. Pivoted to the bar 97 near its upper end is the upper end of an angularly disposed ratchet bar 101 extending downward through the slot opening 102 in the plate 99 and engaging the ratchet wheel 103 secured to the feed roller shaft 66 near its rear end; and this bar is at all times held in yielding engagement with the ratchet wheel by the action of a coiled spring 104 connecting the projections 105 and 106 formed on the guide bar 97 and ratchet bar 101, respectively. The guide bar is offset near its center to be out of alinement with the ratchet wheel and, just below such offset, has a projection 107 comprising a stop adapted to engage the top of a screw 108 threaded upwardly through the top wall of the base portion 4 and provided with a lock nut 109. On the stud 94 is a coiled spring 110 one end of which engages a pin 111 carried by the lever 93 and the other end a fixed member, as the screw 112, on the casing. The action of this spring is to normally hold the lever 93 in its inoperative position, as in Fig. 6, with the projection 107 on the bar 97 engaging the stop screw 108, and with the spacing bar 89 in its uppermost position which is determined by the position of adjustment of the said screw 108.

Secured on the hub of the type wheel 35 is the spacing wheel 113 having a mutilated periphery divided into sections with equal angular measurement and corresponding in number to that of the type bars. When the type wheel is moved downward to engage the platen, it carries with it the spacing wheel 113 and the section of the periphery of the latter wheel corresponding with the selected word or character to be printed engages the projection 90 on the spacing bar 89, thus forcing the bar downward. This movement of the spacing bar effects a rocking of the lever 93 which in turn raises the guide bar 97 and ratchet bar 101. Then, when the operating lever 25 has been released and the type wheel moves upward, the spring 110 will actuate the lever 93 to raise the spacing bar 89 and force the members 97 and 101 downward until the projection 107 on the bar 97 engages the stop 108, the type wheel continuing in its movement until the bumpers 114 on the yoke 18, such members being shown in Figs. 5 and 6, engage the tops of the guide-ways in the head 7. In the downward movement of the ratchet bar 101 the teeth thereon will engage those on the ratchet wheel 103 imparting the desired angular rotation thereto and, thereby, through the shaft 66 a like angular rotation of the feed rollers 12 to advance the check the length of the printed word plus the space to be between that and the next word or character to be printed. The pin-and-slot connection 95 of the lever 93 and ear 96 of the bar 97 provides for a slight lost motion whereby the stripper arms 85 will effect a disengagement of the check from the type before rotation of the feed rollers commences.

As the words or characters on the type bars increase or decrease in length, a corresponding greater or smaller feed of the check is necessary. To secure this a correspondingly longer or shorter stroke of the spacing bar 89 is necessary, which is determined by the time when the finger or projection 90 is engaged by the spacing wheel 113 in its downward movement with the type wheel. The more feed that is desired for the check the less must the spacing wheel be cut away to correspond and the less feed that is desired for the check the more will the spacing wheel be cut away for that particular type bar. The adjustment of the stop screw 108 determines the length of the space between the words or characters on the check. When the type wheel and spacing bar are in inoperative or raised position, the relative position of the projection 90 and spacing wheel 113 is determined by the adjustment of the stop 108, and the length of the space between the characters printed on a check will be increased or decreased accordingly as such projection is moved nearer or farther from the spacing wheel. The bottom plate 115 is removable which permits access to the stop screw 108 and other parts of the mechanism contained within the base of the machine.

When the projection 107 engages the stop 108 the lower and free end of the ratchet bar 101 simultaneously engages a stop comprising a portion 116 bent from a plate 117 riveted to the side wall of the base portion 4, and the member 116 holds the ratchet bar in position to positively lock the ratchet wheel against rotation after each forward movement of the check until the next printing operation is commenced. This stop member 116 can be bent by a suitable tool to compensate for any adjustment of the screw 108, it being essential that both the stops be engaged simultaneously by their respective contracting members.

The front wall of the base is cut away to receive a drawer 118 which is supported on the bottom plate 115 and inclosed within a housing 119, and this drawer contains a well saturated ink pad 120 for supplying ink to the rollers 56.

The operation of the machine is as follows:—

A check is placed on the base cover plate 11 and the check gage properly adjusted to secure printing along the desired line. The lever 72 is then operated to raise the gripping rollers 69 allowing the check to be moved onto the feed rollers 12 and in proper position for printing. A selected line of type is brought into printing position by turning the dial wheel 36 to bring the corresponding indication thereon under the pointer 39. The lever 25 is then given an angular throw to cause the printing operation and as the pressure on the lever is released, thus allowing the type wheel to move away from engagement with the platen, the check is automatically fed forward the proper distance to place it in position to receive the next impression.

What I claim is:

1. In a machine of the character described, a platen, a type carrier having a plurality of lines of type thereon, means for moving the carrier to bring a selected line of type into printing position, means for moving the platen and the type carrier relatively toward each other to impress a check held between them, a support for the check, means for automatically feeding the check variable distances to obtain a uniform space between the words or characters printed, adjustable means for predetermining the length of such space, and means for automatically locking the said feeding means against further movement when the check has been advanced the proper distance to receive the next impression.

2. The combination, in a check writing machine, of a support for a check, a platen and a fixed support therefor, a revolubly supported type wheel having a uniform reciprocating movement to impress a check held between the platen and a selected line of type, a revolubly supported shaft, feed rollers secured to said shaft, a toothed wheel secured to said shaft, a spacing bar having a variable movement, means carried by the type wheel for moving the spacing bar a distance determined by the line of type to be printed, and means actuated by the movement of said spacing bar for imparting rotation to said feed rollers through the medium of said toothed wheel.

3. The combination, in a check writing machine, of a support for a check, a platen and a fixed support therefor, a revolubly supported type wheel having a uniform reciprocating movement to impress a check held between the platen and a selected line of type, a revolubly supported shaft, feed rollers secured to said shaft, a toothed wheel secured to said shaft, a spacing wheel secured to said type wheel and having a mutilated periphery, a spacing bar adapted to be engaged by the periphery of said spacing wheel and having a variable movement determined by the line of type to be printed, and means actuated by the movement of said spacing bar for imparting rotation to said feed rollers through the medium of said toothed wheel, for the purpose specified.

4. The combination, in a check writing machine, of a support for a check, a platen and a fixed support therefor, a revolubly supported type wheel having a uniform reciprocating movement to impress a check held between the platen and a selected line of type, a revolubly supported shaft, feed rollers secured to said shaft, a toothed wheel secured to said shaft, a spacing wheel secured to said type wheel and having a mutilated periphery, a spacing bar adapted to be engaged by the periphery of said spacing wheel and having a variable movement determined by the line of type to be printed, means actuated by the movement of said spacing bar for imparting rotation to said feed rollers through the medium of said toothed wheel to effect a movement of the check along the said support a distance equal to the length of the word or character printed plus a uniform space, and adjustable means for predetermining the length of such space.

5. The combination, in a check writing machine, of a support for a check, a platen and a fixed support therefor, a revolubly supported type wheel having a uniform reciprocating movement to impress a check held between the platen and a selected line of type, a revolubly supported shaft, feed rollers secured to said shaft, a toothed wheel secured to said shaft, a spacing wheel secured to said type wheel and having a mutilated periphery, a spacing bar adapted to be engaged by the periphery of said spacing wheel and having a variable movement determined by the line of type to be printed, means actuated by the movement of said spacing bar to impart rotation to said feed rollers through the medium of said toothed wheel, and automatically operable means for engaging said toothed wheel to lock the feed rollers against further rotation when the check has been advanced a distance determined by the movement of said spacing bar.

6. In a check writing machine, a shaft, a type wheel having a plurality of lines of type thereon and a spacing wheel having a mutilated periphery both secured to said shaft, a support in which said shaft is revolubly mounted, manually operable means for imparting a uniform reciprocation to said support, and a spacing bar guided by said support and adapted to be engaged by the periphery of said spacing wheel in the manner and for the purpose specified.

7. In a check writing machine, a shaft, a type wheel having a plurality of lines of type thereon and a spacing wheel having a mutilated periphery both secured to said shaft, a support in which said shaft is revolubly mounted, manually operable means for imparting a uniform reciprocation to said support, a U-shaped spacing bar guided by said support, and a projection on such bar adapted to be engaged by the periphery of said spacing wheel in the manner and for the purpose specified.

8. In a check writing machine, a shaft, a type wheel having a plurality of lines of type thereon and a spacing wheel having a mutilated periphery both secured to said shaft, a support in which said shaft is revolubly mounted, manually operable means for imparting a uniform reciprocation to said support, elastic means for returning the parts to inoperative position, a spacing bar guided by said support and adapted to be engaged by the periphery of said spacing wheel in the manner and for the purpose specified, and elastic means for returning the said bar to its starting position independent of the return movement of the said support.

9. In a check writing machine, a casing having guideways therein, a yoke slidable in said guideways, a shaft revolubly mounted in said yoke, a type wheel having a plurality of lines of type thereon and a spacing wheel having a mutilated periphery both secured to said shaft, manually operable means for moving said support to bring the type wheel into operative position, elastic means for returning the parts to inoperative position, a spacing bar guided in said yoke and adapted to be engaged by the periphery of said spacing wheel in the manner and for the purpose specified, and elastic means for returning the said bar to its starting position independent of the return movement of the said support.

10. In a check writing machine, a revolubly supported shaft, feed rollers secured to the shaft, a ratchet wheel secured to the shaft, a vertically movable guide bar, a ratchet bar pivoted at one end to said guide bar, elastic means for holding the ratchet bar in engagement with said ratchet wheel, a guide plate slotted to receive both the said bars, a lever fulcrumed near its center and having pivotal connection at one end with said guide bar, a reciprocating spacing bar having pivotal connection with the other end of said lever, a reciprocating type carrier, and means controlled by the movement of the type carrier for effecting through the action of the spacing bar and said lever a reciprocation of both said guide bar and said ratchet bar in the manner and for the purpose specified.

11. In a check writing machine, a revolubly supported shaft, a ratchet wheel secured to said shaft, a ratchet bar adapted in its downward movement to effect a rotation of said wheel, a vertically movable guide bar to which the upper end of said ratchet bar is pivoted, an elastic connection between said bars for yieldingly holding the ratchet bar in engagement with said wheel, means for guiding said bars, a manually operable lever, and means controlled by the operation of said lever for raising and lowering the guide bar to effect a reciprocation of the ratchet bar in the manner and for the purpose specified.

12. In a check writing machine, a revolubly supported shaft, a ratchet wheel secured to said shaft, a ratchet bar adapted in its downward movement to effect a rotation of said wheel, a vertically movable guide bar to which the upper end of said ratchet bar is pivoted, an elastic connection between said bars for yieldingly holding the ratchet bar in engagement with said wheel, means for guiding said bars, a manually operable lever, means controlled by the operation of said lever for raising and lowering the guide bar to effect a reciprocation of the ratchet bar in the manner and for the purpose specified, and an adjustable stop for limiting the downward movement of the guide bar.

13. In a check writing machine, a revolubly supported shaft, a ratchet wheel secured to said shaft, a ratchet bar adapted in its downward movement to effect a rotation of said wheel, a vertically movable guide bar to which the upper end of said ratchet bar is pivoted, an elastic connection between said bars for yieldingly holding the ratchet bar in engagement with said wheel, means for guiding said bars, a manually operable lever, means controlled by the operation of said lever for raising and lowering the guide bar to effect a reciprocation of the ratchet bar in the manner and for the purpose specified, and a stop engaged by the ratchet bar in its downward movement to cause such bar while in engagement with said stop to lock the ratchet wheel against rotation.

14. In a check writing machine, a revolubly supported shaft, a ratchet wheel secured to said shaft, a ratchet bar adapted in its downward movement to effect a rotation of said wheel, a vertically movable guide bar to which the upper end of said ratchet bar is pivoted, an elastic connection between said bars for yieldingly holding the ratchet bar in engagement with said wheel, means for guiding said bars, a manually operable lever, means controlled by the operation of said lever for raising and lowering the guide bar to effect a reciprocation of the ratchet bar in the manner and for the purpose specified, an adjustable stop for limiting the downward movement of the guide bar, and a second adjustable stop engaged by the ratchet bar in its downward movement to cause such bar while in engagement with said second named stop to lock the ratchet wheel against rotation, both said stops being simultaneously engaged by their respective contacting members.

15. In a check writing machine, a support for a check, a revolubly supported shaft, a ratchet wheel secured to the shaft, feed rollers secured to the shaft, a ratchet bar and means for holding the same in yielding engagement with the ratchet wheel, a reciprocating type carrier, means for stripping the check from the type in the return movement of the type carrier after the printing operation, and connections between the type carrier and the ratchet bar for effecting through the movement of the carrier a reciprocation of said bar in the manner and for the purpose specified, said connections providing for a lost motion to prevent rotation of the said ratchet wheel by said bar until the said function of the stripper has been performed.

HERMAN C. WELTER.